(12) United States Patent
Ohtsuka

(10) Patent No.: US 8,767,976 B2
(45) Date of Patent: Jul. 1, 2014

(54) SOUND PICKUP DEVICE

(75) Inventor: Yoshio Ohtsuka, Osaka (JP)

(73) Assignee: Panasonic Corporation, Osaka (JP)

( * ) Notice: Subject to any disclaimer, the term of this patent is extended or adjusted under 35 U.S.C. 154(b) by 303 days.

(21) Appl. No.: 13/329,332

(22) Filed: Dec. 19, 2011

(65) Prior Publication Data

US 2012/0224716 A1    Sep. 6, 2012

(30) Foreign Application Priority Data

Mar. 2, 2011 (JP) ................................ 2011-044637
May 31, 2011 (JP) ................................ 2011-122125

(51) Int. Cl.
*H04R 3/00*    (2006.01)

(52) U.S. Cl.
USPC .............. 381/92; 381/122; 381/56; 381/97; 381/26; 361/679.23

(58) Field of Classification Search
USPC ............... 381/92, 26, 122, 355, 365, 366, 56, 381/313, 322, 329, 86, 94.4, 97; 361/679.01, 679, 23; 396/105, 283, 396/312
See application file for complete search history.

(56) References Cited

U.S. PATENT DOCUMENTS 3,837,736 A * 9/1974 Ogiso et al. .................... 352/12

FOREIGN PATENT DOCUMENTS

| JP | 2003-101834 A | | 4/2003 |
| JP | 2003101834 A | * | 4/2003 |
| JP | 2003-348419 A | | 12/2003 |

* cited by examiner

*Primary Examiner* — Leshui Zhang
(74) *Attorney, Agent, or Firm* — Shinjyu Global IP

(57) ABSTRACT

A sound pickup device is provided that includes a first housing, a second housing, a first microphone, and a second microphone. The second housing is coupled to the first housing and is configured to change positions with respect to the first housing. The first microphone is mounted on the first housing and is configured to output a first audio signal based on sound picked up by the first microphone. The second microphone is mounted on the second housing and is configured to output a second audio signal based on sound picked up by the second microphone.

8 Claims, 11 Drawing Sheets

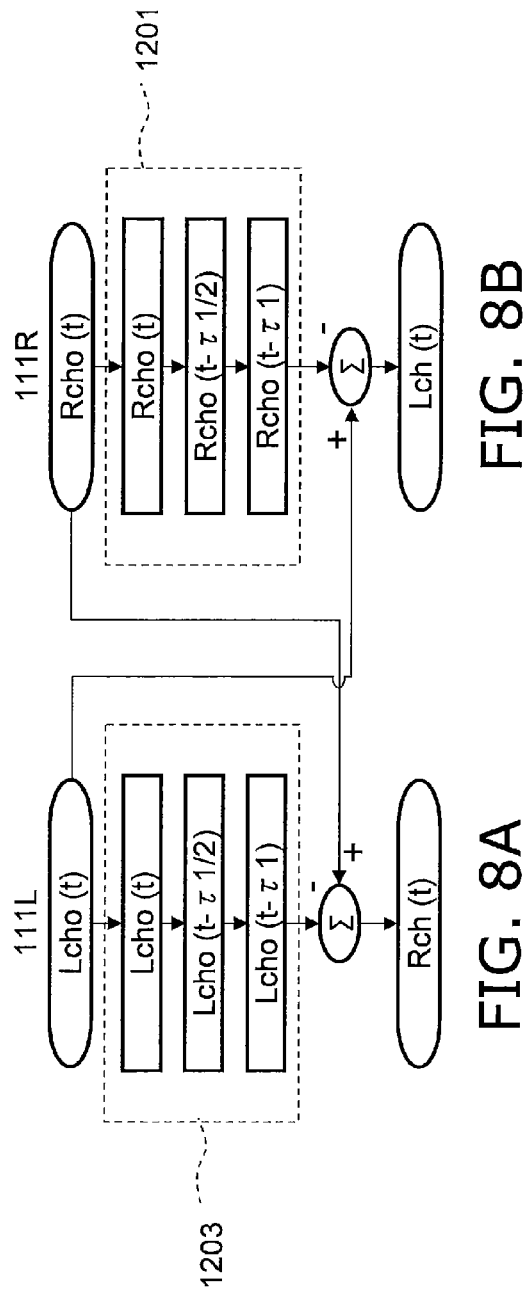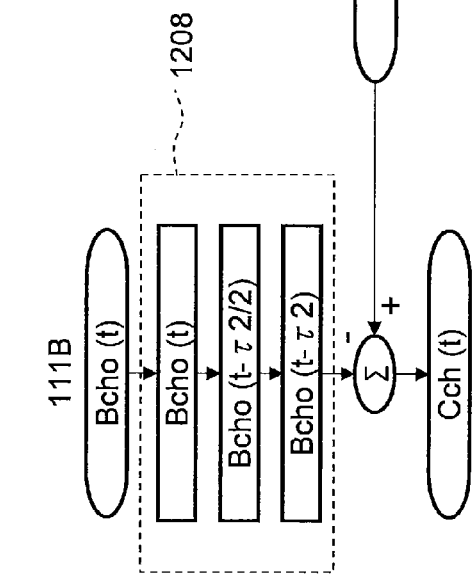
FIG. 8A
FIG. 8B
FIG. 8C

SOUND PICKUP DEVICE

CROSS-REFERENCE TO RELATED APPLICATIONS

This application claims priority to Japanese Patent Application No. 2011-044637, filed on Mar. 2, 2011 and Japanese Patent Application No. 2011-122125, filed on May 31, 2011. The entire disclosure of Japanese Patent Application No. 2011-044637 and Japanese Patent Application No. 2011-122125 are hereby incorporated herein by reference.

BACKGROUND

1. Technical Field

The technology disclosed herein relates to a sound pickup device with which the quality of an audio signal is improved by performing various kinds of processing with respect to an inputted audio signal.

2. Background Information

Recent years have seen growing demand for more compact sizes in electronic devices equipped with a sound pickup device. When an electronic device is made smaller, this is accompanied by a reduction in the surface area of the device. Accordingly, it is sometimes difficult to find room for a microphone on the surface of the electronic device. In view of this, if there is unused space on a movable member provided to the electronic device, the microphone may be disposed on this movable member. For example, Japanese Laid-Open Patent Application 2003-348419 discloses a constitution in which a stereo microphone is provided on a pop-up strobe of a video camera.

With a conventional video camera (hereinafter referred to as "camera"), two microphones are provided on the strobe. The two microphones are disposed on the left and right sides of the strobe so as to obtain directionality in the left and right direction. However, with these two microphones, it is difficult to obtain directionality in the direction facing the subject (the depth direction). In view of this, the microphones may be disposed in the forward and backward direction (the optical axis direction) in order to obtain directionality in the depth direction. In this case, it may be difficult to ensure enough space on the strobe to dispose the microphones in the forward and backward direction.

SUMMARY

One object of the technology disclosed herein is to provide a sound pickup device that can be installed in small electronic devices. Another object is to improve the quality of the audio signal by performing various kinds of processing with respect to inputted audio signals.

The sound pickup device disclosed herein comprises a first housing, a second housing, a first microphone, a second microphone. The second housing is coupled to the first housing and is configured to change positions with respect to the first housing. The first microphone is mounted on the first housing and is configured to output a first audio signal based on sound picked up by the first microphone. The second microphone is mounted on the second housing and is configured to output a second audio signal based on sound picked up by the second microphone.

These and other objects, features, aspects and advantages of the technology disclosed herein will become apparent to those skilled in the art from the following detailed description, which, taken in conjunction with the annexed drawings, discloses example embodiments of the present invention.

BRIEF DESCRIPTION OF THE DRAWINGS

Referring now to the attached drawings, which form a part of this original disclosure:

FIG. 8A is a detail view of the directionality synthesis processing with the digital camera 100 in accordance with the first embodiment;

FIG. 8B is a detail view of the directionality synthesis processing with the digital camera 100 in accordance with the first embodiment;

FIG. 8C is a detail view of the directionality synthesis processing with the digital camera 100 in accordance with the first embodiment;

DETAILED DESCRIPTION OF EMBODIMENTS

Selected embodiments of the present technology will now be explained with reference to the drawings. It will be apparent to those skilled in the art from this disclosure that the following descriptions of the embodiments of the present technology are provided for illustration only and not for the purpose of limiting the technology as defined by the appended claims and their equivalents.

First Embodiment

An embodiment of the present technology will now be described through reference to the drawings. Portions that are the same or similar will be numbered the same or similarly in the following description of the drawings. However, the drawings are merely schematics, and proportional sizes and so forth may not be the same as in actuality. Therefore, the specific dimensions and so forth should be determined by referring to the following description. Naturally, size relations and proportions may vary from one drawing to the next.

In the following embodiment, a digital camera will be described as one example of an imaging device, which is an electronic device equipped with a sound pickup device. In the following description, with the imaging device in its usual orientation (hereinafter also referred to as landscape orientation), the direction facing the subject will be referred to as "to the front," the direction facing away from the subject as "to the rear," the vertically upward direction as "upward," the vertically downward direction as "downward," to the right in a state of being directly in front of the subject as "to the right," and to the left in a state of being directly in front of the subject as "to the left."

The digital camera 100 in the First Embodiment comprises a microphone unit 111. Sound is picked up by the microphone unit 111 during moving picture imaging, and audio recording is performed along with image recording. The configuration and operation of the digital camera 100 will now be described.

1. Configuration 1-1. Configuration of Digital Camera 100

The configuration of the digital camera 100 will now be described through reference to the drawings.

Figure 1B:
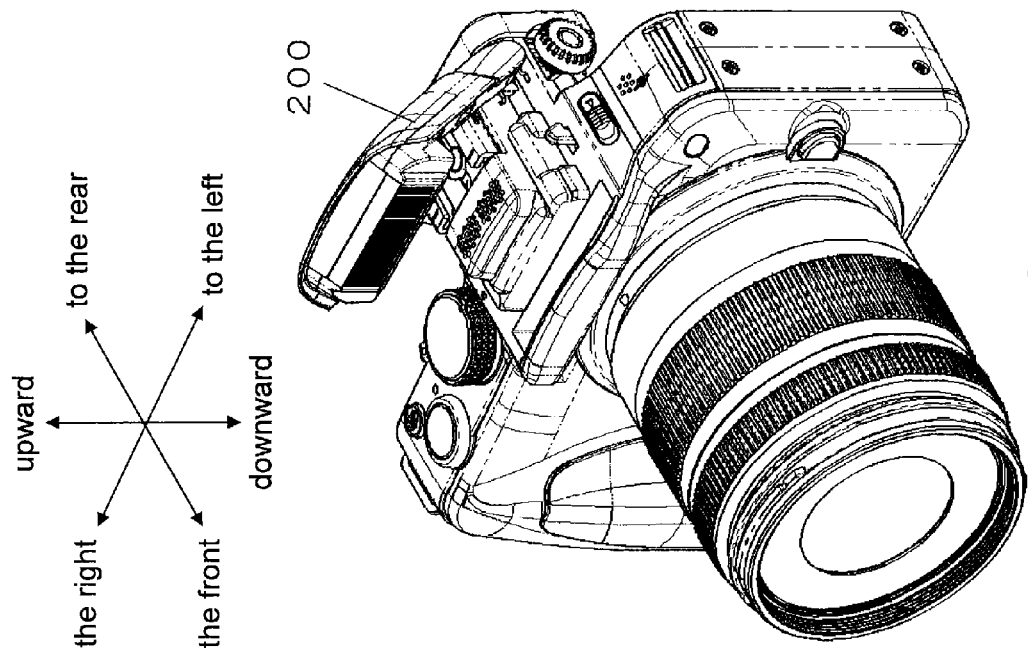
FIG. 1B consists of front oblique views of a digital camera 100 in accordance with the first embodiment.
Figure 1A:
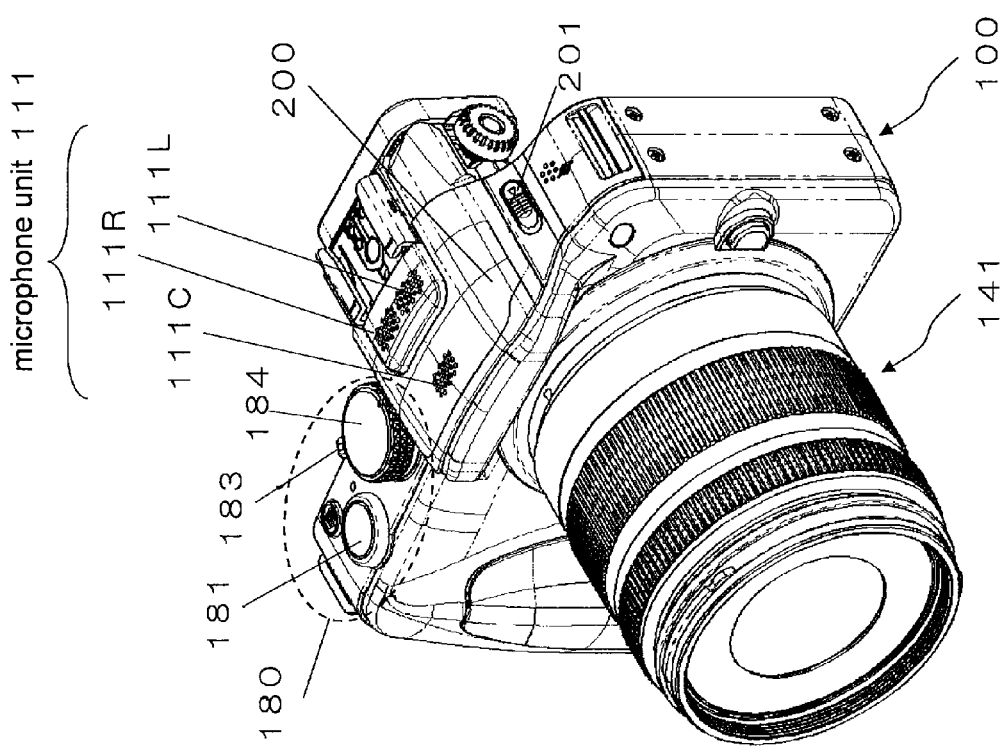
FIG. 1A consists of front oblique views of a digital camera 100 in accordance with a first embodiment.

FIG. 1A is a front oblique view of the digital camera 100 in a state in which a strobe 200 has been closed (has been stowed in the main body). The digital camera 100 is equipped with a lens barrel 141 on its front face. Also, the digital camera 100 is equipped with a manipulation component 180, such as a release button 181, a power switch 183, and a mode dial 184, on its top face.

The digital camera 100 further comprises the strobe 200 and a pop-up lever 201 on its top face.

The digital camera 100 also comprises the microphone unit 111 on its top face. The microphone unit 111 includes three microphones. These three microphones are constituted by a microphone 111L, a microphone 111R, and a microphone 111C. Of these, the microphone 111L and microphone 111R are positioned aligned in the left and right direction on the top face of the main body of the digital camera 100. The microphone 111C is positioned on a perpendicular bisector of a line segment connecting the point where the microphone 111L is positioned and the point where the microphone 111R is positioned, and to the front of the of the microphone 111L and the microphone 111R. The microphone 111C is positioned on the top face of the strobe 200. In a state in which the strobe 200 is closed, the plane including the three microphones (namely, the microphone 111L, the microphone 111R, and the microphone 111C) is substantially parallel to the optical axis of the lens barrel 141.

FIG. 1B is a front oblique view of the digital camera 100 in a state in which the strobe 200 has been opened upward (protrudes upward from the main body). A rotation shaft (not shown) for rotating the strobe 200 is provided to the top face of the main body of the digital camera 100. This rotation shaft extends in the left and right direction to the rear side of the strobe 200. When the strobe 200 rotates within a specific range around this rotation shaft, the front of the strobe 200 protrudes upward, that is, goes into an open state. When the strobe 200 is open, the microphone 111C moves by a specific amount away from the top face of the digital camera 100, based on a state in which the strobe 200 is closed. Therefore, when the strobe 200 is open, the plane including the three microphones (namely, the microphone 111L, the microphone 111R, and the microphone 111C) and the optical axis of the lens barrel 141 form a certain angle θ.

Figure 9A:
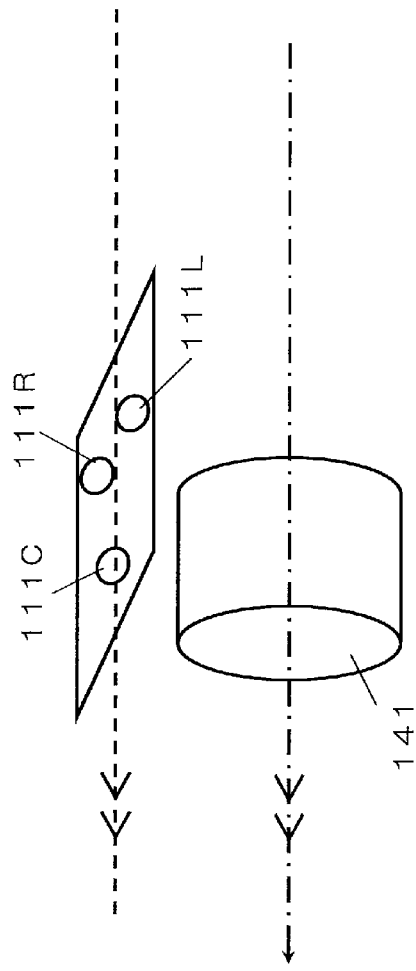
FIG. 9A shows the positional relations of the microphones 111L, 111R, and 111C with a lens barrel 141 of the digital camera 100 in accordance with the first embodiment.
Figure 9B:
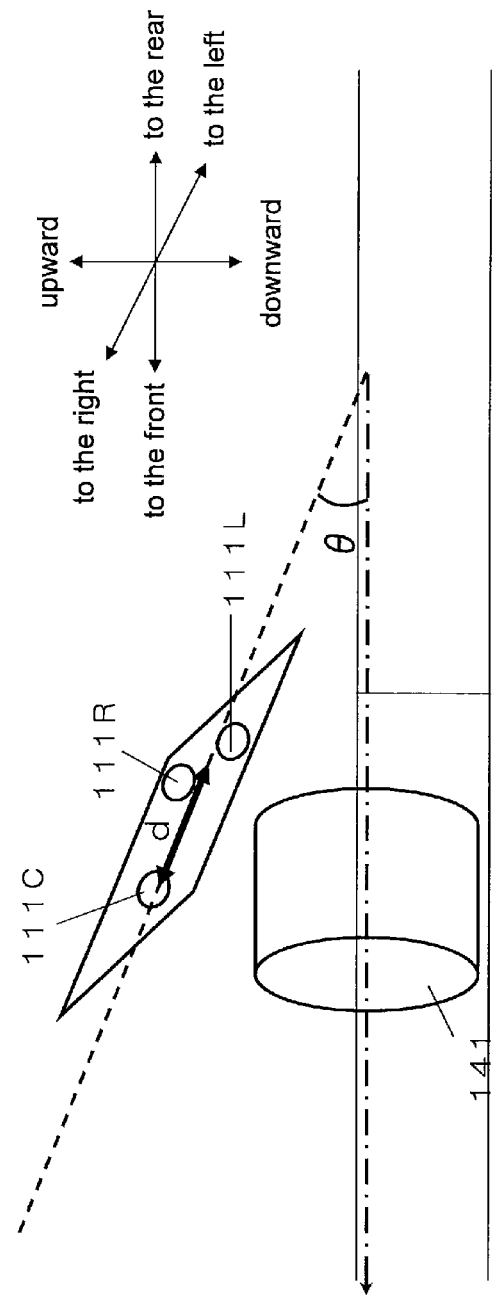
FIG. 9B shows the positional relations of the microphones 111L, 111R, and 111C with a lens barrel 141 of the digital camera 100 in accordance with the first embodiment.

FIG. 9 shows the positional relations of the microphones 111L, 111R, and 111C and the lens barrel 141. FIG. 9A shows a state in which the strobe 200 has been closed. In a state in which the strobe 200 has been closed, the optical axis of the lens barrel 141 and the plane including the microphone 111L, the microphone 111R, and the microphone 111C are substantially parallel. FIG. 9B shows a state in which the strobe 200 has been opened. In a state in which the strobe 200 has been opened, the optical axis of the lens barrel 141 and the plane including the microphone 111L, the microphone 111R, and the microphone 111C form a certain angle θ.

Thus, if a constitution is adopted in which a plurality of microphones are dispersed on the main body of the digital camera 100 and the strobe 200, whose orientation with respect to the digital camera 100 varies, a change in the relative orientation of the main body of the digital camera 100 and the strobe 200 results in a change in the characteristics of an audio signal that is picked up. In view of this, the digital camera 100 of this embodiment is such that, as will be discussed below, a controller 130 (one example of a control unit) determines the control details for directional characteristics of the first and second microphones according to the result which a strobe open/closed detector 202 (one example of a detection unit) has detected whether strobe 200 is open or closed. A digital video/audio processor 120 performs directionality synthesis processing with respect to the output of the microphone 111L, the microphone 111R, and the microphone 111C according to these control details. Consequently, there is less discrepancy in directionality due to a relative change in the orientation of the main body of the digital camera 100 and the strobe 200 (a change in the open or closed state of the strobe 200).

The term "orientation" as used here encompasses the position and/or the facing direction of the strobe.

Figure 2:
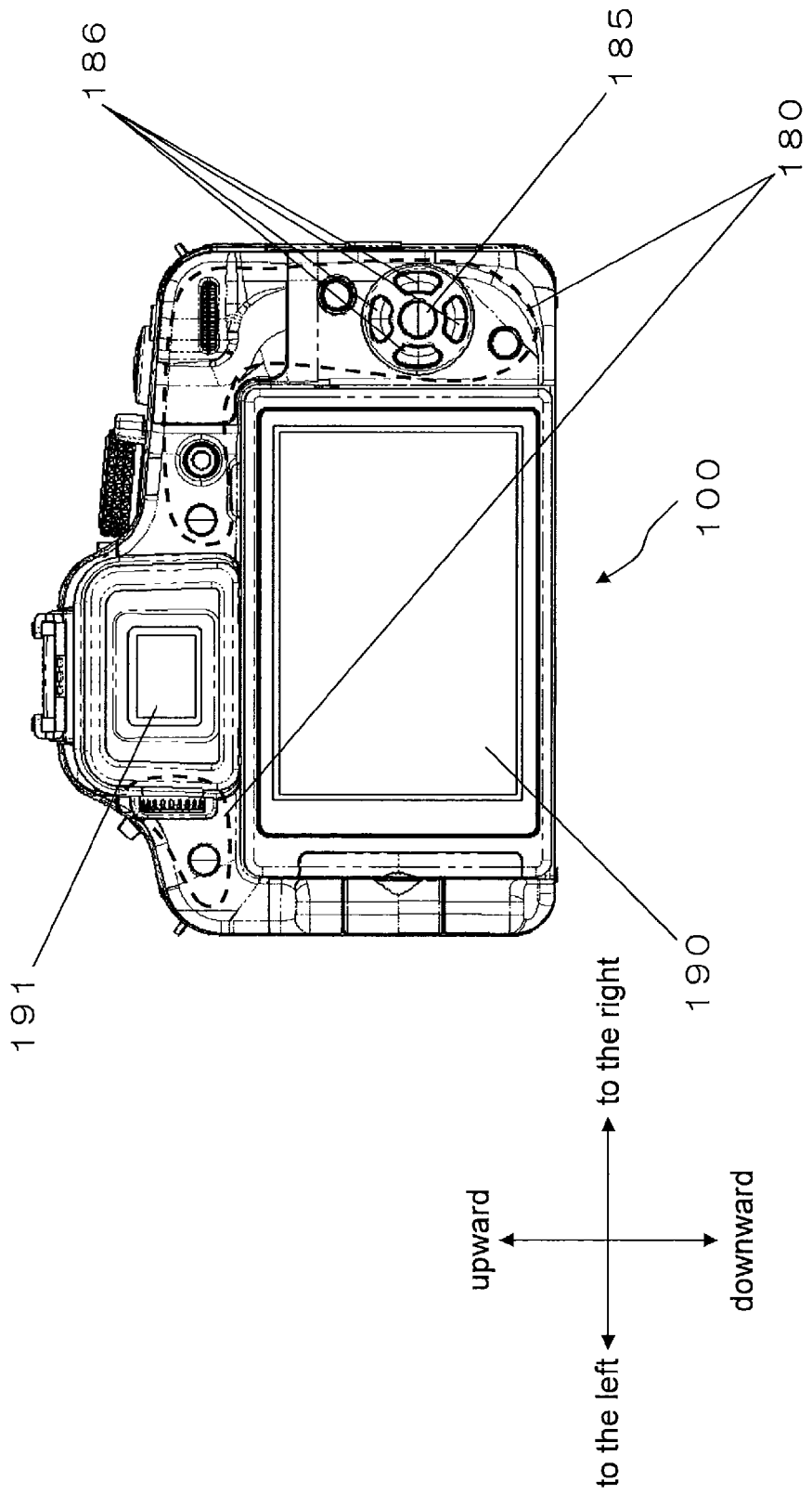
FIG. 2 is a rear view of the digital camera 100 in accordance with the first embodiment.

FIG. 2 is a rear view of the digital camera 100. The digital camera 100 comprises a manipulation component 180, such as a center button 185 and a cross button 186, on its rear face. The digital camera 100 also comprises a display component 190 and a viewfinder 191 on its rear face.

Figure 3:
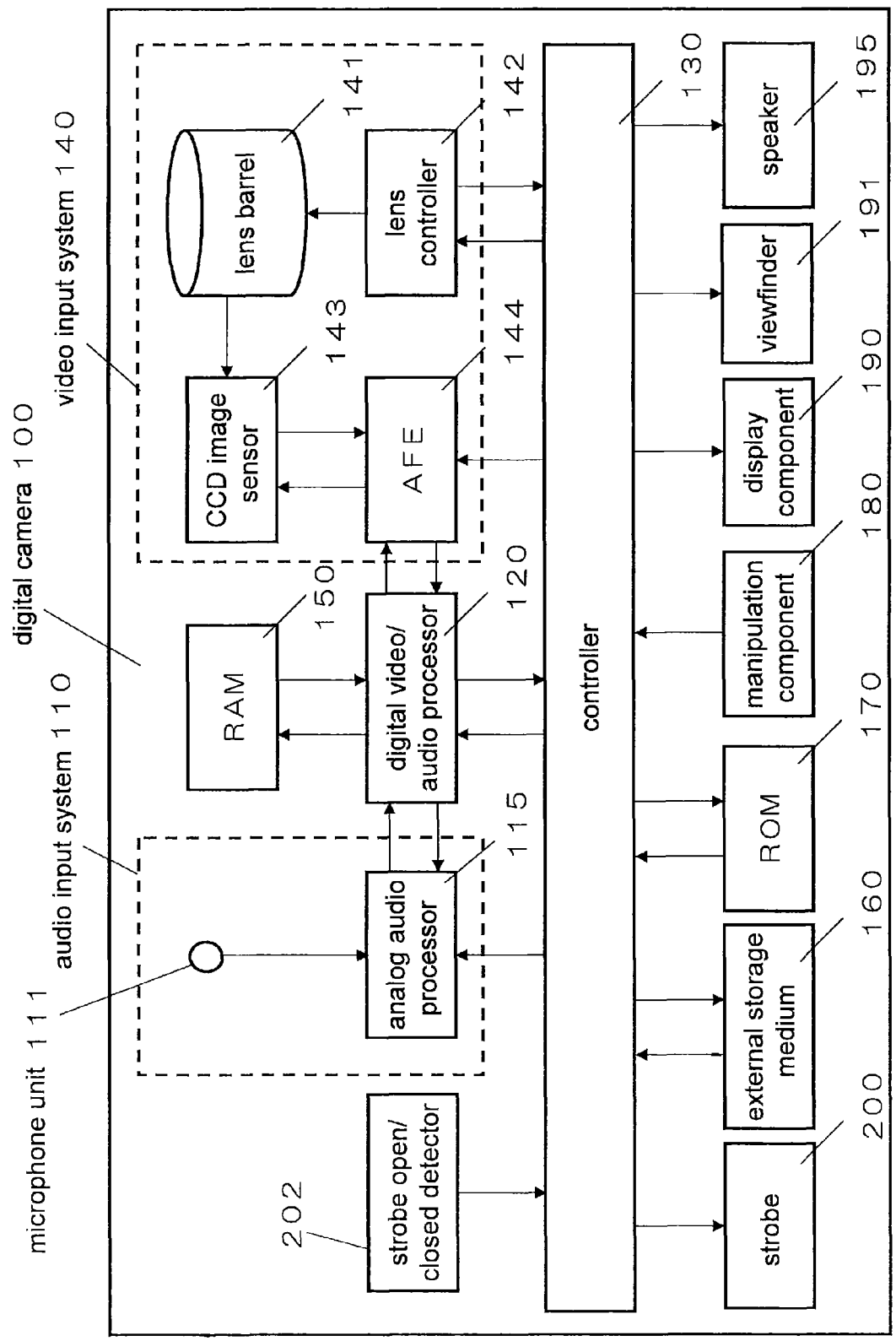
FIG. 3 is a block diagram of the electrical constitution of the digital camera 100 in accordance with the first embodiment.

FIG. 3 is a diagram of the electrical constitution of the digital camera 100. The digital camera 100 comprises a video input system 140, an audio input system 110, the digital video/audio processor 120, the controller 130, a RAM 150, the strobe 200, the strobe open/closed detector 202, an external storage medium 160, a ROM 170, the manipulation component 180, the display component 190, the viewfinder 191, and a speaker 195.

The digital camera 100 produces video information and audio signal on the basis of information obtained from the outside. The video information is produced by the video input system 140. An audio signal is produced by the audio input system 110. The video information and audio signal produced here are subjected to A/D conversion and undergo various processing by the digital video/audio processor 120, after which they are recorded to the external storage medium 160, such as a memory card. The video information recorded to the external storage medium 160 is displayed on the display component 190 and/or the viewfinder 191 when the manipulation component 180 is operated by the user. An audio signal recorded to the external storage medium 160 is outputted from the speaker 195 when the manipulation component 180 is operated by the user.

The various components shown in FIGS. 1 to 3 will now be described in detail.

The video input system 140 comprises the lens barrel 141, a lens controller 142, a CCD image sensor 143, and an AFE (analog front end) 144.

The lens barrel 141 is an optical system having a plurality of lenses. The lens barrel 141 performs subject focal adjustment, image angle adjustment, incident light amount adjustment, shake correction, and so forth by means of a motor driven according to a control signal sent out from the lens controller 142, and forms a subject image.

The CCD image sensor 143 captures the subject image formed through the lens barrel 141, and produces video information. Numerous photodiodes are arranged two-dimensionally (in a matrix) on the light receiving face of the CCD image sensor 143. Also, R, G, and B primary color filters corresponding to the various photodiodes are disposed. The R, G, and B primary color filters are disposed in a specific layout structure. Light from the subject (what is being imaged) passes through the lens barrel 141, after which an image is formed on the light receiving face of the lens controller CCD image sensor 143. The subject image thus formed is converted into color information divided up into R, G, and B according to the amount of light incident on the various photodiodes. As a result, video information indicating the entire subject image is produced. The photodiodes correspond to pixels of the CCD image sensor 143. The color information actually outputted from the individual photodiodes is primary color information for either R, G, or B. Accordingly, the color that is to be expressed by each pixel is produced on the basis of primary color information (color and amount of light) outputted from the photodiode corresponding to each pixel and the surrounding photodiodes in the digital video/audio processor 120 of the next stage. The CCD image sensor 143 can also produce video information for a new frame at predetermined time intervals if the digital camera 100 is in the imaging mode.

The AFE 144 performs noise suppression by correlated double sampling with respect to the video information read out from the CCD image sensor 143, amplification to the input range width of an A/D converter by an analog gain controller, and A/D conversion by A/D converter. After this, the AFE 144 outputs the video information to the digital video/audio processor 120.

The strobe open/closed detector 202 detects whether the strobe 200 is in an open or closed state, and inputs this detection result to the controller 130. Detection of the open or closed state is accomplished, for example, by providing a switch that is pressed on by the strobe 200 when the strobe 200 is closed, and off when the strobe 200 is opened, and inputting the on/off state of this switch to the controller 130.

The audio input system 110 comprises the microphone unit 111 and an analog audio processor 115. The microphone unit 111 includes the microphones 111L, 111R, and 111C. The microphone unit 111 converts acoustic signals into electrical signals with the various microphones, and inputs these signals to the analog audio processor 115. The analog audio processor 115 performs A/D conversion by the A/D converter with respect to a processed audio signal, and outputs the result to the digital video/audio processor 120.

The digital video/audio processor 120 performs various kinds of processing on the video information outputted from the AFE 144 and the audio signal outputted from the analog audio processor 115. For example, the digital video/audio processor 120 performs gamma correction, white balance correction, scratch correction, encoding processing, and so forth, with respect to the video information, according to instructions from the controller 130 Also, the digital video/audio processor 120 performs various kinds of processing with respect to the audio signal according to instructions from the controller 130. The digital video/audio processor 120 may be a hard-wired electronic circuit, or may be a microprocessor that executes programs, for example. The digital video/audio processor 120 may also be a single semiconductor chip that is integrated with the controller 130, etc.

The digital video/audio processor 120 computes the output of the microphone unit 111 and performs directionality synthesis processing. FIG. 7 is an example of directionality synthesis processing. The microphone 111L and the microphone 111R are disposed in the same plane, which is perpendicular to the optical axis of the lens barrel 141. The microphone 111C is disposed on a perpendicular bisector of a line segment created by the microphone 111L and the microphone 111R. As a result, the microphones 111L, 111R, and 111C make up an isosceles triangle whose bottom is a line segment created by the microphone 111L and the microphone 111R.

The layout of the microphone unit 111 and the directionality synthesis processing performed by the digital video/audio processor 120 will now be described in detail through reference to FIG. 7.

Figure 7A:
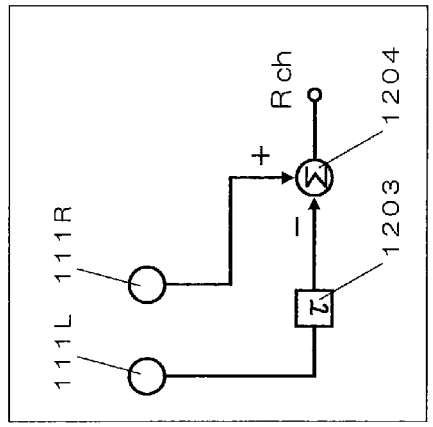
FIG. 7A shows an example of directionality synthesis processing with the digital camera 100 in accordance with the first embodiment.

FIG. 7A is a diagram of the positions of the microphones 111L, 111R, and 111C and a virtual microphone 111B. The virtual microphone 111B will be discussed below. FIG. 7A shows the microphones 111L, 111R, and 111C so that the plane including the microphones 111L, 111R, and 111C is parallel to the paper plane, regardless of whether the strobe 200 is open or closed. The microphones 111L and 111R are disposed aligned in the left and right direction. The virtual microphone 111B is a microphone virtually positioned at the center point of the line segment connecting the microphones 111L and 111R. The digital video/audio processor 120 produces the output of the virtual microphone 111B by computing on the basis of the output of the microphones 111L and 111R. The line segment connecting the microphones 111L and 111R and the line segment connecting the virtual microphone 111B and the microphone 111C are perpendicular to each other.

The distance between the virtual microphone 111B and the microphone 111C is expressed by the letter d. The outputs when directionality synthesis processing is executed using the outputs of the microphones 111L, 111R, and 111C so that there will be directionality to the left, to the right, and to the front, are termed the Lch output, the Rch output, and the Cch output, respectively.

Figure 7B:
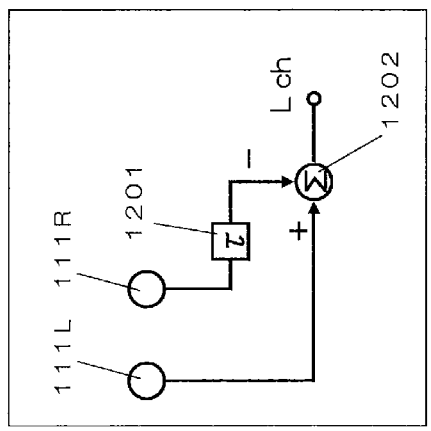
FIG. 7B shows an example of directionality synthesis processing with the digital camera 100 in accordance with the first embodiment.

FIG. 7B is a diagram of directionality synthesis processing for obtaining the Lch output. A sound wave coming from the right of the digital camera 100 reaches the microphone 111R on the right side first, after which it reaches the microphone 111L on the left side time τ1 later. Accordingly, the output of the right microphone 111R is retarded by this time τ1, and this result is subtracted from the output of the left microphone 111L. The output with respect to the sound wave coming from the right is canceled out by these processing. A retarder 1201 imparts a delay of time τ1 to the output of the microphone 111R. A subtracter 1202 subtracts the output of the retarder 1201 from the output of the microphone 111L to obtain the Lch output. The above processing yields an Lch output with lower sensitivity to a sound wave coming from the right.

Figure 7C:
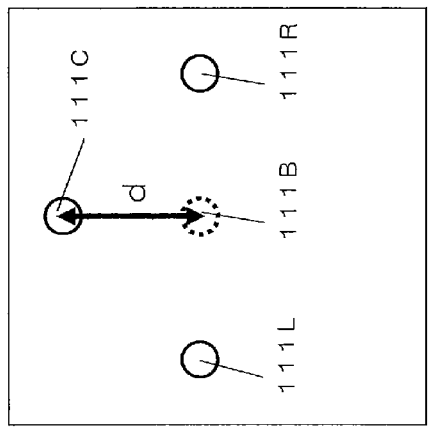
FIG. 7C shows an example of directionality synthesis processing with the digital camera 100 in accordance with the first embodiment.

FIG. 7C is a diagram of directionality synthesis processing for obtaining an Rch output. The processing is the same as that in FIG. 7B except that left and right are switched. That is, a retarder 1203 imparts a delay of time τ to the output of the microphone 111L. A subtracter 1204 subtracts the output of the retarder 1203 from the output of the microphone 111R to obtain an Rch output. The above processing yields an Rch output of lower sensitivity to a sound wave coming from the left.

Figure 7D:
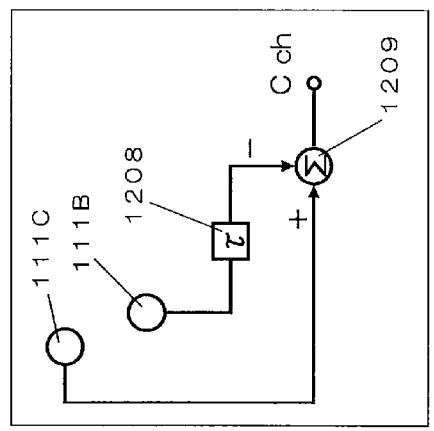
FIG. 7D shows an example of directionality synthesis processing with the digital camera 100 in accordance with the first embodiment.

FIG. 7D is a diagram of the processing for obtaining the output of the virtual microphone 111B shown in FIG. 7A. The output of the virtual microphone 111B, which is positioned geometrically in the center of the left and right microphone, is obtained by averaging the outputs of the left and right microphones 111L and 111R. An amplifier 1205 halves the output of the microphone 111L. An amplifier 1206 halves the output of the microphone 111R. An adder 1207 adds the output of the amplifier 1205 to the output of the amplifier 1206. This yields the output of the virtual microphone 111B.

Figure 7E:
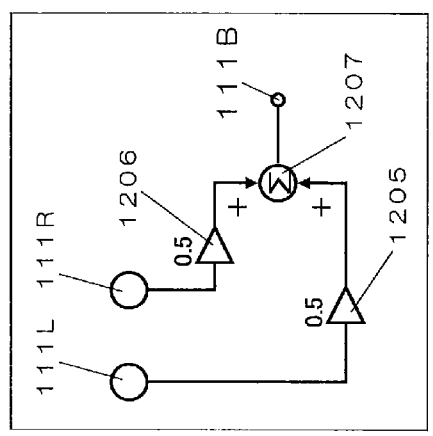
FIG. 7E shows an example of directionality synthesis processing with the digital camera 100 in accordance with the first embodiment.

FIG. 7E is a diagram of directionality synthesis processing for obtaining a Cch output. A sound wave coming from the rear reaches the rear microphone (that is, the virtual microphone 111B) first, after which it reaches the front microphone 111C time τ2 later. The output of the rear virtual microphone 111B is retarded by this time τ2, and this result is subtracted from the output of the microphone 111C. The output with respect to a sound wave coming from the rear is canceled out by these processing. A retarder 1208 imparts a delay of this time τ2 to the output of the virtual microphone 111B. A subtracter 1209 subtracts the output of the retarder 1208 from the output of the microphone 111C to obtain a Cch output. The above processing yields a Cch output of lower sensitivity to a sound wave coming from the rear.

The outputs produced by the above-mentioned directionality synthesis processing are expressed as follows.

$Lch$ output: $Lch(t)=Lcho(t)-Rcho(t-\tau1)$ $Rch$ output: $Rch(t)=Rcho(t)-Lcho(t-\tau1)$ $Cch$ output: $Cch(t)=Ccho(t)-Bcho(t-\tau2), Bcho(t-\tau2)$
$=Lcho(t-\tau2)/2+Rcho(t-\tau2)/2$ Here, the actual outputs of the microphones 111L, 111R, 111C, and 111B are expressed by Lcho(t), Rcho(t), Ccho(t), and Bcho(t), and the outputs produced by directionality synthesis processing are expressed by Lch(t), Rch(t), and Cch(t). Lch(t), Rch(t), and Cch(t) correspond to the above-mentioned Lch output, Rch output, and Cch output, respectively.

As shown in FIG. 8A-8C, the outputs Lch(t), Rch(t), and Cch(t) after directionality synthesis processing are calculated by retarding the actual outputs Lcho(t), Rcho(t), and Bcho(t) with the retarders 1201, 1203, and 1208.

For example, when new data Lcho(t), Rcho(t), and Bcho(t) are inputted at the retarders 1201, 1203, and 1208, the old data Lcho(t−τ1), Rcho(t−τ1), and Bcho(t−τ2) are outputted. More specifically, in FIG. 8A-8C, the actual outputs Lcho(t), Rcho(t), and Bcho(t) are inputted to the retarders 1201, 1203, and 1208 at times that are one-half the delay times τ1 and τ2. Once the delay times τ1 and τ2 have elapsed, the past actual outputs Lcho(t−τ1), Rcho(t−τ1), and Bcho(t−τ2) are outputted.

Here, the retarders 1201, 1203, and 1208 are included in the digital video/audio processor 120. For example, if the digital video/audio processor 120 has a DSP (digital signal processor), the above-mentioned delay processing is executed on the DSP delay memory, such as a DSP register. Consequently, data can be accessed faster than when the actual outputs Lcho(t), Rcho(t), and Bcho(t) are stored in the RAM 150, so the directionality synthesis processing can be performed faster.

When the directionality synthesis processing described above is executed at the digital video/audio processor 120, this yields Lch output Lch(t), Rch output Rch(t), and Cch output Cch(t). Consequently, just the audio corresponding to what is being imaged by the digital camera 100 (the imaging object) can be selected. Specifically, by excluding the effect of sound from the rear, the sound corresponding to the imaging object can be recorded as realistic audio.

In FIG. 8A-8C, an example in which the actual outputs Lcho(t), Rcho(t), and Bcho(t) are inputted to the retarders 1201, 1203, and 1208 at times that are one-half the delay times τ1 and τ2 is given in order to facilitate the description. But the time intervals at which the actual outputs Lcho(t), Rcho(t), and Bcho(t) are inputted to the retarders 1201, 1203, and 1208 are not limited to that given in this embodiment, and any interval may be used.

The display component 190 is disposed on the rear face of the digital camera 100. In this embodiment, the display component 190 is a liquid crystal display. The display component 190 displays an image corresponding to the video information processed by the digital video/audio processor 120. Images that are displayed by the display component 190 include through images, reproduced images, and so forth. A through image is an image of a frame newly and continuously produced at regular time intervals by the CCD image sensor 143. Usually, in a state in which the digital camera 100 has been set to imaging mode, the digital video/audio processor 120 produces a through image from video information produced by the CCD image sensor 143 in a standby state in which no still picture imaging is being performed, or in a moving picture imaging state. The user can look at the through image displayed on the display component 190 to capture an image of a subject while checking the composition of the subject.

A reproduced image is produced by the digital video/audio processor 120 when the digital camera 100 is in reproduction mode. A reproduced image is an image obtained by reducing the pixel count of a high-pixel count image recorded to the external storage medium 160 or the like. The image reduced the pixel count matches the size of the display component 190. The high-pixel count video information recorded to the external storage medium 160 is produced by the digital video/audio processor 120 on the basis of video information produced by the CCD image sensor 143 after the release button 181 has been operated in a specific way by the user. The speaker 195 outputs at audio signal recorded to the external storage medium 160. The display content displayed by the display component 190 may also be displayed on the viewfinder 191.

The controller 130 controls the overall operation of the entire digital camera 100.

The ROM 170 stores programs to be executed by the controller 130, such as programs related to autofocus control (AF control), automatic exposure control (AE control), control over the light emission of the strobe 200, as well as programs for the overall control of the entire digital camera 100.

The ROM 170 also stores various conditions and settings related to the digital camera 100. The conditions and settings includes the detection results of the strobe open/closed detector (the result of detecting whether the strobe is open or closed). In this embodiment, the ROM 170 is a flash ROM.

The controller 130 may be a hard-wired electronic circuit, or may be a microprocessor that executes programs, for example. Also, the controller 130 may also be a single semiconductor chip that is integrated with the digital video/audio processor 120, etc. The ROM 170 does not have to be external to the controller 130 (that is, separate from the controller 130), and may be incorporated into the interior of the controller 130.

The RAM 150 functions as a working memory for the digital video/audio processor 120 and the controller 130. The RAM 150 can be an SDRAM, a flash memory, or the like. The RAM 150 also function as an internal memory for recording video information, audio signals, and so forth. The detection result of the strobe open/closed detector may also be stored in the RAM 150.

The external storage medium 160 is an external memory equipped with a nonvolatile recorder such as a flash memory in its interior. The external storage medium 160 is able to record data such as video information and audio signals processed by the digital video/audio processor 120.

The manipulation component 180 is a collective name for manipulation interfaces, such as buttons or dials, disposed on the outside of the digital camera 100. The manipulation component 180 is manipulated by the user. The manipulation component 180, for example, includes the release button 181, the power switch 183, the mode dial 184, the center button 185, the cross button 186, and so forth shown in FIGS. 1, 2, and 3. Upon being manipulated by the user, the manipulation component 180 sends the controller 130 signals directing various operations.

The release button 181 is a push button that operates in two stages, namely, a half-pressed state and a fully pressed state. When the release button 181 is pressed halfway down by the user, the controller 130 executes AF (auto-focus) control and/or AE (auto-exposure) control, etc., and determines the imaging conditions. In AF control, the digital video/audio processor 120 calculates a contrast value in a specific region of the video information, the controller 130 drives the lens barrel 141 through the lens controller 142 on the basis of this calculation, and feedback control is performed so that the contrast value is at its maximum. As a result of AF control, the controller 130 obtains a focal distance to the subject that is to undergo AF control. Also, as a result of AF control, the lens barrel 141 images the subject that is to undergo AF control on the CCD image sensor 143. When the user presses the release button 181 all the way down, the controller 130 records to the external storage medium 160, etc., the video information captured at the timing of the full depression of the button.

The power switch 183 is a sliding switch for switching the power supply on or off to the various components of the digital camera 100. When the power is off and the user slides the power switch 183 to the right, the controller 130 supplies power to the various components of the digital camera 100 and actuates these components. When the power is on and the user slides the power switch 183 to the left, the controller 130 shuts off the supply of power to the various components of the digital camera 100.

The mode dial 184 is a rotary dial. When the mode dial 184 is turned by the user, the controller 130 switches the operating mode of the digital camera 100 to the operating mode corresponding to the current rotational position of the mode dial 184. Operating modes include, for example, auto-imaging mode, manual imaging mode, and scene selection mode. Herein, the auto-imaging mode, manual imaging mode, and scene selection mode will be collectively referred to as the imaging mode.

The center button 185 is a push button. When the digital camera 100 is in imaging mode or reproduction mode and the user presses the center button 185, the controller 130 displays a menu screen on the display component 190. A "menu screen" is a screen used by the user for setting various imaging conditions and reproduction conditions. When the center button 185 is pressed in a state in which the user has selected a value for a setting category of a certain condition on the menu screen, the setting category is set to the value. The setting thus selected is stored in the ROM 170.

The cross button 186 comprises four push buttons provided on the up, down, left, and right. The user presses the button in one of these directions of the cross button 186 in order to select the value of a setting category for a certain condition displayed on the menu screen.

The strobe 200 includes a xenon tube. The xenon tube is driven by a capacitor, a step-up circuit, and a light emission trigger circuit. The step-up circuit applies high voltage to the capacitor according to a control signal from the controller 130. The light emission trigger circuit synchronizes with the imaging and cause the capacitor to discharge high voltage. More specifically, the light emission trigger circuit cause the charged capacitor to discharge high voltage according to a control signal from the controller 130, and to instantly flash light in the xenon gas inside the xenon tube. Consequently, the digital camera 100 can image the lighted subject. Specifically, the xenon tube of the strobe 200 instantly emits light toward the subject to compensate the brightness of the subject during the imaging of the subject.

The light emission of the xenon tube of the strobe 200 includes pre-emission and main emission. Pre-emission is emission prior to imaging. In pre-emission, the amount of light reflected from the subject as a result of emission from the xenon tube is measured, and the distance to the subject is determined on the basis of this amount of reflected light. The amount of emission of the xenon tube during imaging is found from this determination result. Main emission is executed in synchronization with the timing of imaging, using the amount of emission found by pre-emission.

1-2. Correlation to Present Technology

The main body of the digital camera 100 is an example of the first housing of the present technology. The strobe 200 is an example of the second housing of the present technology. The microphone unit 111 is one example of the sound pickup device of the present technology. The microphones 111L and 111R are one example of the first microphone of the present technology. The microphone 111C is one example of the second microphone of the present technology. The analog audio processor 115 is one example of a sound receiver of the present technology. The audio input system 110 is one example of a sound input component of the present technology. The digital video/audio processor 120 is one example of the directional control unit of the present technology. The strobe open/closed detector 202 is one example of the detector of the present technology. The controller 130 is one example of the control unit of the present technology. The manipulation component 180 is one example of a setting component of the present technology. The display component 190 is one example of a display component of the present technology. And the digital camera 100 is one example of the electronic device of the present technology.

2. Operation

Next, the operation in moving picture imaging mode of the digital camera 100 pertaining to the First Embodiment will be described. The digital camera 100 displays a through image on the display component 190 in a standby state in moving picture imaging mode, or in a moving picture imaging state during moving picture imaging. The flow of the overall operation during moving picture imaging mode will first be described below through reference to FIGS. 4 to 6, and then the flow of operation in strobe open/closed detection processing will be described, and then the flow of operation in sound recording in moving picture imaging will be described.

Figure 4:
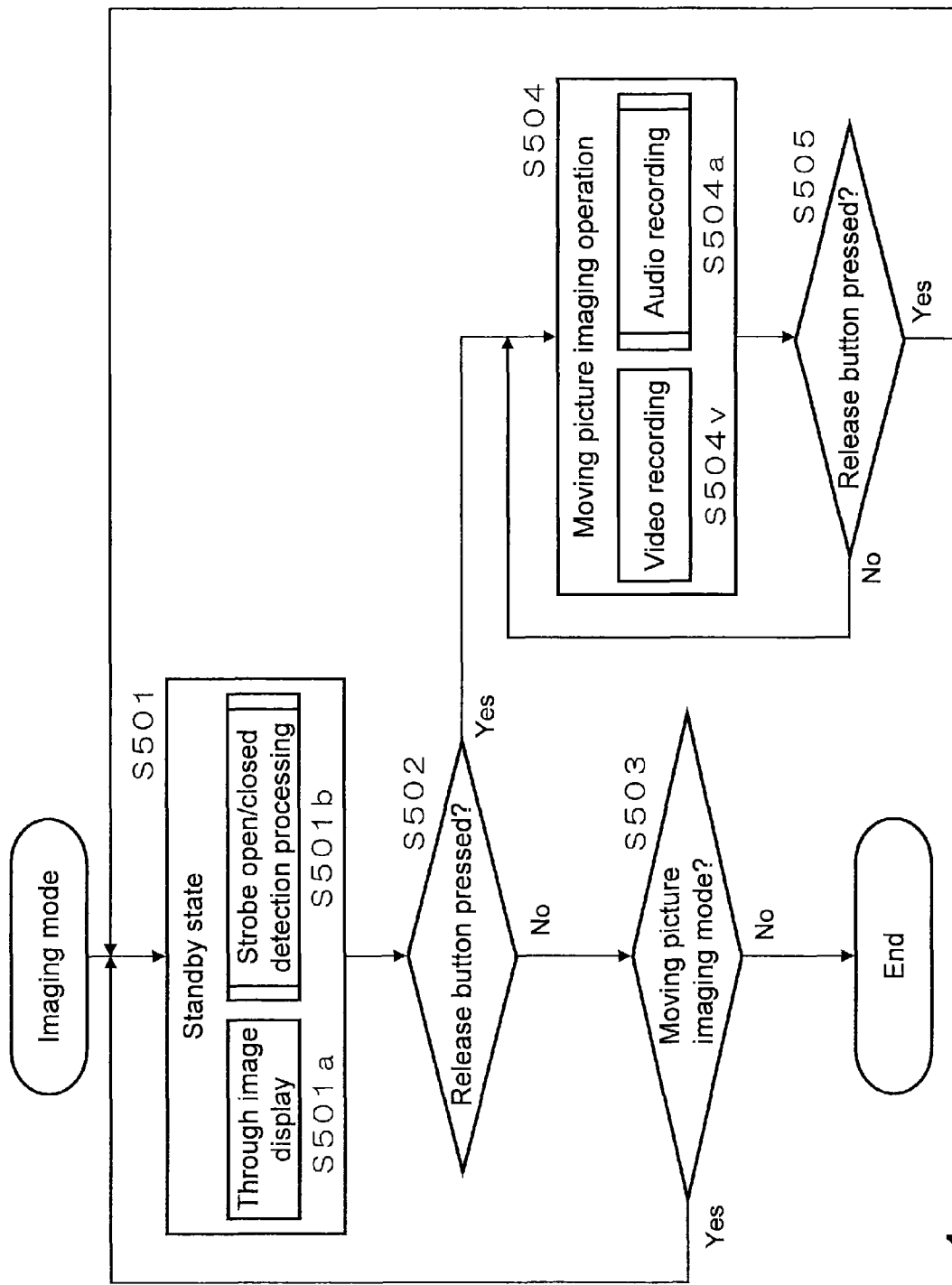
FIG. 4 is a flowchart of the operation during moving picture imaging mode of the digital camera 100 pertaining to one embodiment.

FIG. 4 is a flowchart of the overall flow of operation during moving picture imaging mode of the digital camera 100. When the power switch 183 is operated in a state in which the mode dial 184 indicates moving picture imaging mode, the power is switched on. The digital camera 100 is set in moving picture imaging mode. The standby state of step S501 includes the through image display processing of step S501a and the strobe open/closed detection processing of step S501b. In step S501a, the controller 130 displays the through image outputted by the digital video/audio processor 120 on the display component 190. In step S501b, the strobe open/closed detector 202 detects whether the strobe 200 is closed or open, and inputs this detection result to the controller 130. Step S501 is a standby state in moving picture imaging mode. Next, in step S502, the controller 130 determines whether or not the release button 181 has been pressed.

In step S502, if the controller 130 determines that the release button 181 has been pressed (Yes in S502), the moving picture imaging operation of step S504 is executed. The moving picture imaging operation of step S504 includes the image recording operation of step S504v and the audio recording operation of step S504a. In the moving picture imaging operation of step S504, the recording of video information and an audio signal equal to a period of one frame is performed, for example. A "period of one frame" is the inverse of the frame rate during moving picture imaging, and if the frame rate is 60 frames/second, for example, one frame period is 1/60 second. The image recording operation of step S504v is as described briefly in the description of the configuration, and will not be described in detail here. The details of the audio recording operation of step S504a will be discussed below.

Next, in step S505, the controller 130 determines whether or not the release button 181 has been pressed. If the controller 130 determines in step S505 that the release button 181 has not been pressed (No in S505), then the controller 130 performs an moving picture imaging operation for the next frame period in step S504. If the controller 130 determines that the release button 181 has been pressed (Yes in S505), then the controller 130 ends the moving picture imaging operation, and manages the standby state of step S501. Thus, in moving picture imaging mode the digital camera 100 performs a moving picture imaging operation from the time when the release button 181 is pressed until it is pressed once more.

On the other hand, if the controller 130 determines in step S502 that the release button has not been pressed (No in S502), then the controller 130 determines the imaging mode in step S503. In step S503, if the controller 130 determines that the operating mode is the moving picture imaging mode (Yes in S503), then the controller 130 again executes step S501, which is the starting point of the operation in moving picture imaging mode. In step S503, if the controller 130 determines that the operating mode is not the moving picture imaging mode (No in S503), then the controller 130 ends the operation in moving picture imaging mode.

Figure 5:
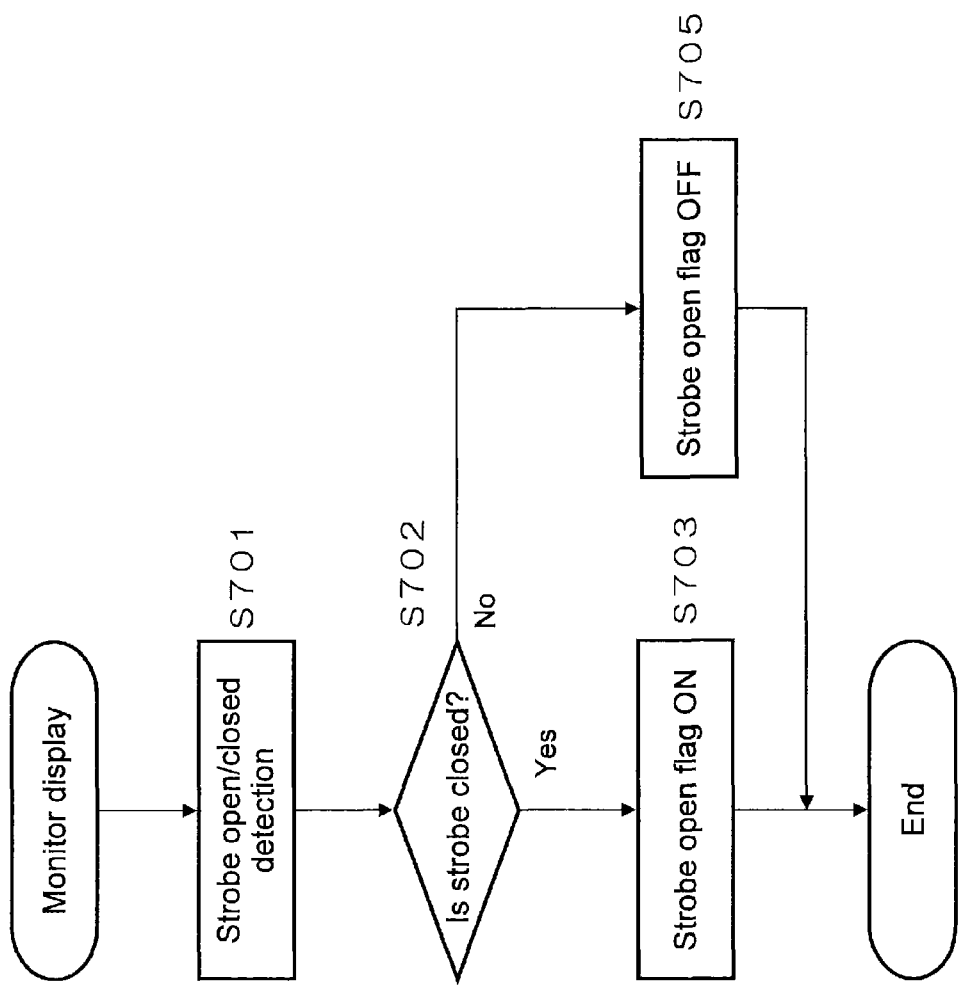
FIG. 5 is a flowchart of the operation in strobe open/closed detection processing with the digital camera 100 in accordance with the first embodiment.

FIG. 5 is a flowchart of the operation in the strobe open/closed detection processing (step S501b) mentioned in the flowchart of FIG. 4. The flow of the operation in strobe open/closed detection processing will now be described.

In step S701, the strobe open/closed detector 202 detects whether the strobe 200 is open or closed, and inputs this detection result to the controller 130.

In step S702, the controller 130 determines whether or not the strobe 200 is open from the detection result of the strobe open/closed detector 202. If the controller 130 determines in step S702 that the strobe 200 is open (Yes in S702), then step S703 is executed. If the controller 130 determines in step S702 that the strobe 200 is closed (No in S702), then step S705 is executed.

In step S703, the controller 130 updates the strobe open flag stored in the ROM 170 to "on." In step S705, the controller 130 updates the strobe open flag stored in the ROM 170 to "off."

The operation of the strobe open/closed detection processing is ended when the processing for updating the strobe open flag of step S703 "on," or the processing for updating the strobe open flag of step S705 to "off" has ended.

Figure 6:
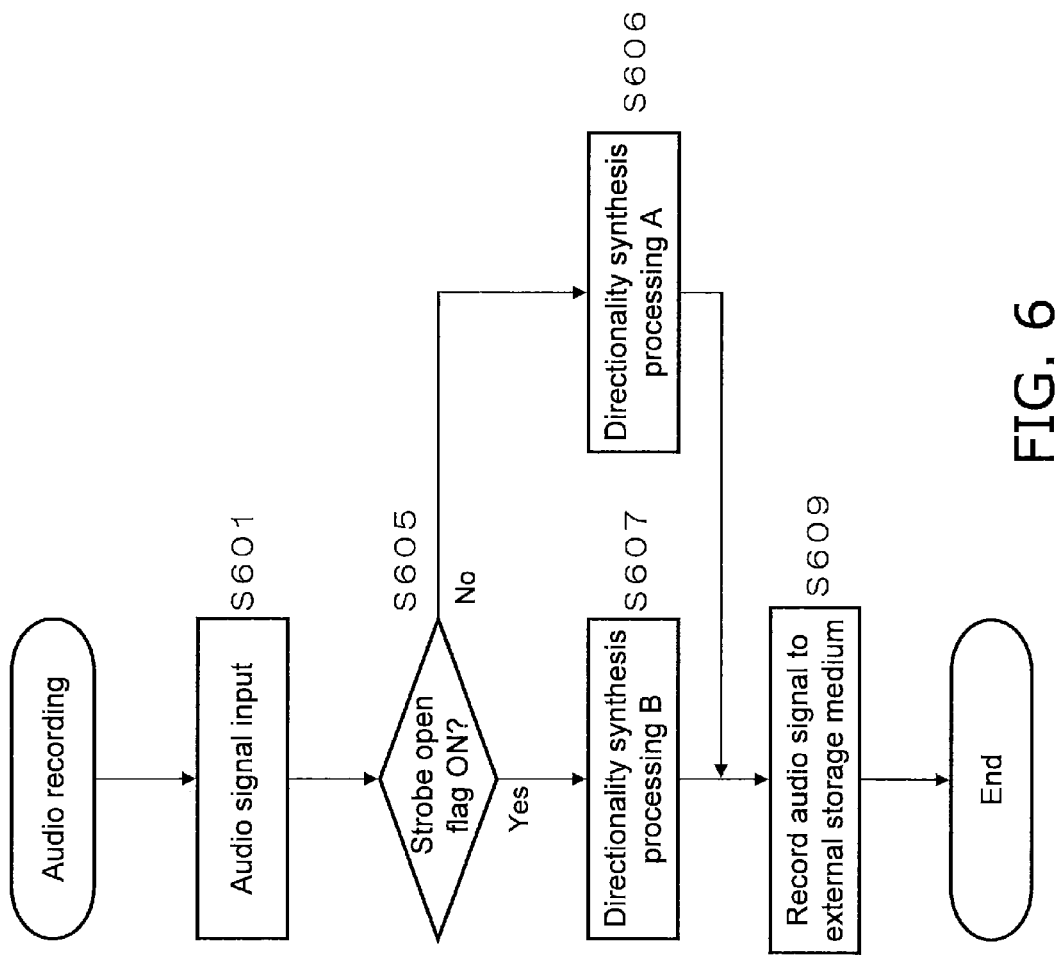
FIG. 6 is a flowchart of the operation in audio recording with the digital camera 100 in accordance with the first embodiment.

FIG. 6 is a flowchart of the operation in the audio recording (step S504a) mentioned in the flowchart of FIG. 4. The flow of the operation in audio recording will now be described.

In step S601, the analog audio processor 115 receives the audio signal outputted by the microphone unit 111, performs various kinds of analog signal processing with respect to this signal, and then outputs the result to the digital video/audio processor 120.

In step S605, the controller 130 accesses the ROM 170 and determines whether or not the strobe open flag stored in the ROM 170 is "on." If the controller 130 determines that the strobe open flag is not "on" (Yes in S605), then step S606 is executed. If the controller 130 determines that the strobe open flag is "on" (No in S605), then step S607 is executed.

In step S606, the digital video/audio processor 120 performs a preset directionality synthesis processing A corresponding to the value of the strobe open flag (that is, "off") read by the controller 130. In this case, since the strobe open flag is "off," the strobe 200 is closed. That is, the plane in which the microphones 111L, 111R, and 111C are located is substantially parallel with the optical axis of the lens barrel 141 as shown in FIG. 9A.

Here, we will let d be the distance between the virtual microphone 111B and the microphone 111C, and let c be the speed of a sound wave. In this case, the time from when a sound wave coming from the rear reaches the virtual microphone 111B until it reaches the microphone 111C, that is, the delay amount τ2 of the retarder 1208, is set as follows.

$$\tau 2 = d/c \quad (1)$$

In step S607, the digital video/audio processor 120 performs a preset directionality synthesis processing B corresponding to the value of the strobe open flag (that is, "on") read by the controller 130. In this case, since the strobe open flag is "on," the strobe 200 is open. That is, the plane in which the microphones 111L, 111R, and 111C are located forms an angle θ with the optical axis of the lens barrel 141 as shown in FIG. 9B.

In this case, the time from when a sound wave coming from the rear reaches the virtual microphone 111B until it reaches the microphone 111C, that is, the delay amount τ2 of the retarder 1208, is set as follows.

$$\tau 2 = (d \cdot \cos \theta)/c \quad (2)$$

Then, in step S609, the audio signal that has undergone the above-mentioned directionality synthesis processing is recorded.

Thus, the change in directionality depending on whether the strobe 200 is open or closed can be reduced by varying the delay time τ2 provided by the retarder according to whether the strobe 200 is open or closed. Specifically, the difference in directionality produced by whether the strobe 200 is open or closed can be reduced by performing the directionality synthesis processing shown in FIG. 7.

3. Conclusion

As discussed above, the digital camera 100 in this embodiment comprises the main body of the digital camera 100, the strobe 200, the microphone 111L and/or microphone 111R, and the microphone 111C. The strobe 200 is configured to change orientation with respect to the main body of the digital camera 100. The microphone 111L and/or microphone 111R is configured to output a first audio signal by sound pickup and is provided to the main body of the digital camera 100. The microphone 111C is configured to output a second audio signal by sound pickup and is provided to the strobe 200.

Because of this constitution, when a digital camera is reduced in size, even if there is not enough space to dispose a microphone in the main body of the digital camera 100, the microphone can still be disposed on a member that is separate from the main body, namely, the strobe 200, which is a movable member with respect to the main body. Consequently, a sound pickup device can be provided which can be installed even in compact devices.

Also, the digital camera 100 of this embodiment further comprises the strobe open/closed detector 202, the controller 130, and the digital video/audio processor 120. The strobe open/closed detector 202 is configured to detect the position and/or orientation of the strobe 200 with respect to the main body of the digital camera 100. The controller 130 is configured to determine the control details for directional characteristics of the first and second microphones according to the detection result for the state of the strobe 200 by the strobe open/closed detector 202. The digital video/audio processor 120 is configured to perform directionality synthesis processing on a first audio signal and second audio signal according to the control details.

Thus, by changing the control details according to whether the strobe 200 is open or closed, it is possible to reduce the change in directionality produced by whether the strobe 200 is open or closed. Specifically, this directionality synthesis processing allows the difference in directionality produced by whether the strobe 200 is open or closed to be reduced.

Other Embodiments

The present technology is not limited to or by the above embodiment, and various embodiments are possible. Other embodiments of the present technology will be given below.

In the above embodiment, the strobe 200 equipped with the microphone 111C rotates within a specific range with respect to the main body of the digital camera 100. In other words, the attitude of the strobe 200 is held in a state in which it was stowed in the main body of the digital camera 100 (a closed state) or a state of protruding upward (an open state). However, the strobe 200 may be variable in position and/or orientation with respect to the main body of the digital camera 100. More precisely, the strobe 200 may be a movable member with respect to the main body so that the relation of the position and/or orientation of the microphone 111C with respect to the microphones 111L and 111R provided on the main body of the digital camera 100 varies.

In the above embodiment, the main body of the digital camera 100 comprises the microphones 111L and 111R, and is constituted so that the output of the virtual microphone 111B is virtually obtained from the output of the microphones 111L and 111R. However, a microphone 111B' may be provided instead of the microphones 111L and 111R. Specifically, a microphone 111B' may be provided instead of the virtual microphone 111B at the center point of the line segment connecting the positions where the microphones 111L and 111R are to be disposed. In this case, the output of the microphone 111B' is used instead of the output of the virtual microphone 111B.

In the above embodiment, the Cch output is obtained by setting the delay amount τ2 of the retarder 1208 when the strobe 200 has been open to a different value from that when the strobe 200 has been closed. Instead of this, the Cch output may be obtained by adding the output of the microphone 111L and the output of the microphone 111R, not using the microphone 111C, in a state in which the strobe 200 is open. Also, the Cch output may be adjusted by multiplying the Cch output obtained above by a specific number. When the strobe 200 is closed, the same processing as in the above embodiment is executed.

In the above embodiment, three microphones constituting a microphone unit were configured so as to form a triangle. In this case, the microphone 111C is disposed in front, and the microphones 111L and 111R are disposed to the rear. Instead of this, as shown in FIG. 10A, the microphone 111C may be disposed to the rear (on the main body of the digital camera 100), and the microphones 111L and 111R may be disposed in the front (on the strobe 200). In this case, the microphone 111C is provided to the main body of the digital camera 100, and the microphones 111L and 111R are provided to the strobe 200.

Figure 10B:
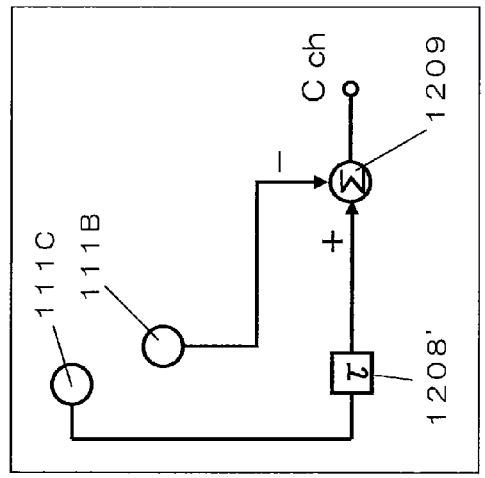
FIG. 10B shows an example of directionality synthesis processing with the digital camera 100 in accordance with another embodiment
Figure 10A:
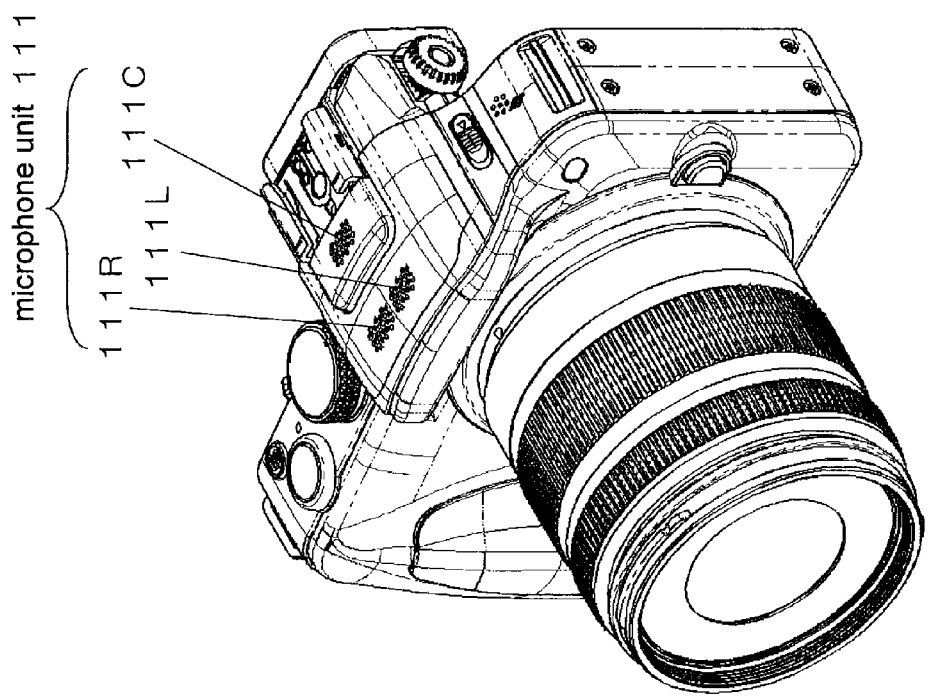
FIG. 10A is a front oblique view and an example of directionality synthesis processing with the digital camera 100 in accordance with another embodiment.

In this case, as shown in FIG. 10B, the line constitutes such that the output of the virtual microphone 111B goes directly into the adder 1207, and a retarder 1208' is disposed on the output line of the microphone 111C. The constitution may also be such that the Cch output is obtained by adding the output of the retarder 1208' of the delay amount τ2 shown in Formula 2 above and the output of the virtual microphone 111B with the adder 1207.

In the above embodiment, the Lch output and the Rch output are constituted by the directionality synthesis processing shown in FIGS. 7A to 7E. However, the optical axis directionality synthesis processing of the lens barrel 141 may be constituted differently from what is shown in FIGS. 7A to 7E.

In the above embodiment, the constitution is such that when the strobe 200 was open, the delay amount τ2 of the retarder 1208 was varied to obtain the Cch output. Instead of this, the constitution may be such that the microphone 111C is not used when the strobe 200 is open. In a state in which the strobe 200 is close, the same processing as in the above embodiment is executed.

In the above embodiment, the microphones 111L and 111R are disposed on the main body of the digital camera 100, and the microphone 111C is disposed on the strobe 200. However, the three microphones may be disposed in any manner, so as long they are disposed so that they are divided up on the main body of the digital camera 100 and the strobe 200, and so that the relation of the position or orientation of each varies with whether the strobe 200 is open or closed. In other words, the constitution may be such that at least one microphone is disposed on the main body of the digital camera 100 and on the strobe 200. Even if the disposition is different from that in the above embodiment, the delay time τ2 at the retarder may be changed according to whether the strobe 200 is open or closed, so as to reduce the change in directionality produced by whether the strobe 200 is open or closed.

In the above embodiment, the microphone unit 111 constitutes of three microphones. However, the microphone unit 111 is not limited to three, and may constitute of two or more microphones.

In the above embodiment, the digital camera 100 was given as an example of a sound pickup device. However, this may be any electronic device that performs the same processing on inputted audio. Specifically, it may be a device that does not perform processing related to images, such as a voice recorder or other such electronic device. Also, the movable member with respect to the main body need not be the strobe 200, and the microphones may be divided up among the main body and any member that is movable with respect to the main body.

In the above embodiment, the digital video/audio processor 120 and the controller 130 includes their respective functions and constitutions described above, but these functions and constitutions may partially be included in the counterpart (the digital video/audio processor 120 or the controller 130).

In the above embodiment, the CCD image sensor 143 is given as an example of an imaging component, but the present technology is not limited to this. Specifically, the present technology can be applied to a CMOS image sensor, an NMOS image sensor, or some other imaging element.

Figure 11B:
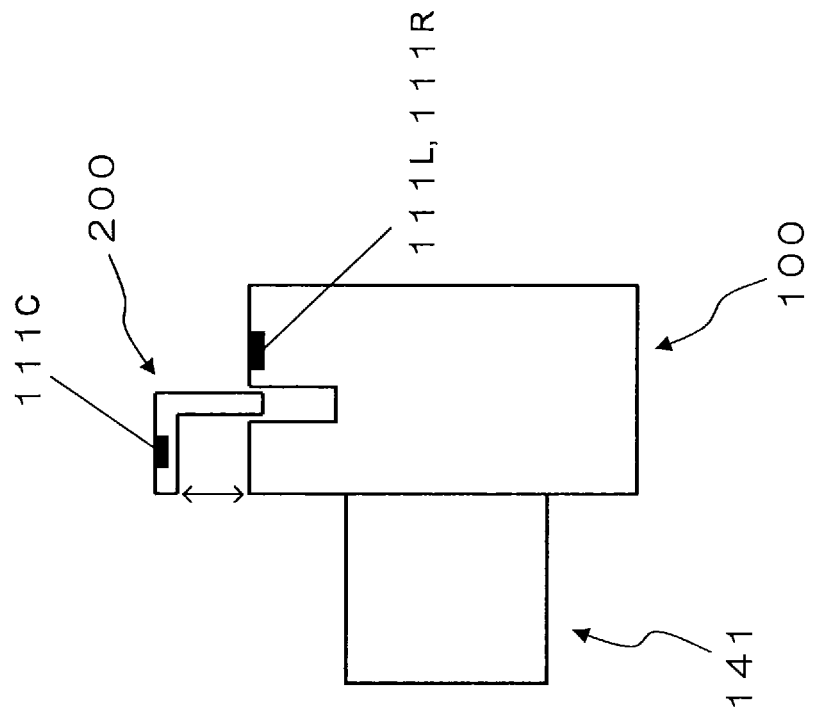
FIG. 11B shows one microphone movable along a linear direction with respect to another microphone in accordance with another embodiment.
Figure 11A:
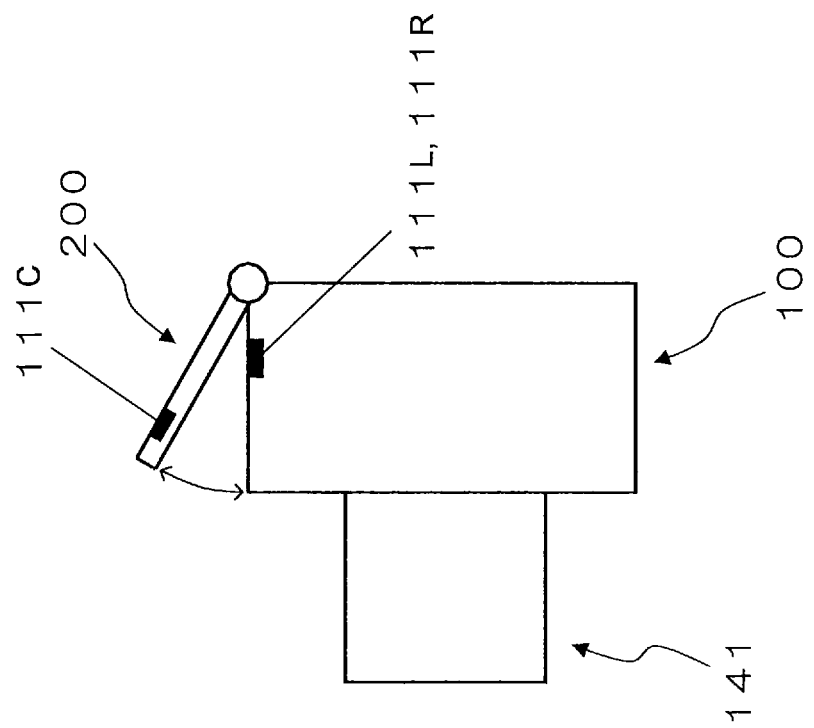
FIG. 11A shows one microphone movable along a non-linear direction with respect to the another microphone in accordance with the first embodiment.

In the above embodiment, as shown in FIG. 11A, the microphone 111C is movable in a non-linear direction with respect to the microphones 111L and 111R. However, as shown in FIG. 11B, the microphone 111C is movable in a linear direction with respect to the microphones 111L and 111R.

General Interpretation of Terms

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a sound pickup device. Accordingly, these terms, as utilized to describe the present technology should be interpreted relative to a sound pickup device.

The term "configured" as used herein to describe a component, section, or part of a device implies the existence of other unclaimed or unmentioned components, sections, members or parts of the device to carry out a desired function.

The terms of degree such as "substantially", "about" and "approximately" as used herein mean a reasonable amount of deviation of the modified term such that the end result is not significantly changed.

While only selected embodiments have been chosen to illustrate the present technology, it will be apparent to those skilled in the art from this disclosure that various changes and modifications can be made herein without departing from the scope of the technology as defined in the appended claims.

For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further technologies by the applicant, including the structural and/or functional concepts embodied by such feature(s). Thus, the foregoing descriptions of the embodiments according to the present technology are provided for illustration only, and not for the purpose of limiting the technology as defined by the appended claims and their equivalents.

INDUSTRIAL APPLICABILITY

With the technology disclosed herein, a sound pickup device can be installed in compact electronic devices, so this technology can be applied to a digital camera, a movie camera, a portable telephone, a voice recorder, or another such device used to record audio data.

What is claimed is:

1. A sound pickup device comprising:
  a first housing;
  a second housing coupled to the first housing and configured to change a position of the second housing with respect to the first housing;
  a first microphone mounted on the first housing and configured to output a first audio signal based on sound picked up by the first microphone
  a second microphone mounted on the second housing and configured to output a second audio signal based on sound picked up by the second microphone;
  a detection unit configured to detect the position of the second housing with respect to the first housing;
  a control unit connected to the detection unit and configured to determine a plurality of control details for changing directional characteristics of the first and second microphones based on the position of the second housing detected by the detection unit; and
  a directional control unit connected to the first and second microphone and configured to perform signal processing on the first and second audio signals based on the control details, the signal processing including changing a delay amount according to a change of the position of the second housing with respect to the first housing, the delay amount being n determined based on a difference between a time when a sound reaches the first microphone and a time when the sound reaches the second microphone.

2. The sound pickup device according to claim 1, wherein:
  the first housing is a camera body; and
  the second housing is a strobe member that is movable between at least two positions with respect to the camera body, the at least two positions including an exposed position and an unexposed position.

3. A sound pickup device comprising:
  a housing;
  a shiftable cover coupled to the housing;
  a first microphone disposed on the housing and configured to output a first audio signal based on sound picked up by the first microphone;

a second microphone disposed on the cover to allow the second microphone to shift positions with respect to the first microphone, the second microphone being configured to output a second audio signal based on sound picked up by the second microphone a detection unit configured to detect the position of the cover with respect to the housing;

a control unit connected to the detection unit and configured to deteimine a plurality of control details for changing directional characteristics of the first and second microphones based on the position of the cover detected by the detection unit; and a directional control unit connected to the first and second microphones and configured to perform signal processing on the first and second audio signals based on the control details, the signal processing including changing a delay amount according to a change of the position of the second housing with respect to the first housing, the delay amount being determined based on a difference between a time when a sound reaches the first microphone and a time when the sound reaches the second microphone.

4. The sound pickup device according to claim 3, wherein the cover is capable of changing positions with respect to the housing.

5. The sound pickup device according to claim 3, wherein the housing is a camera body; and the cover is a strobe member that is movable between at least two positions relative to the camera body.

6. The sound pickup device according to claim 5, wherein the at least two positions include an exposed position and an unexposed position.

7. The sound pickup device according to claim 3, wherein the second microphone is movable along a linear direction with respect to the first microphone.

8. The sound pickup device according to claim 3, wherein the second microphone is movable along a non-linear direction with respect to the first microphone.

\* \* \* \* \*